(12) United States Patent
Bukow

(10) Patent No.: US 8,456,131 B2
(45) Date of Patent: Jun. 4, 2013

(54) SMART WALL PLATE

(76) Inventor: Hans Bukow, Mill Valley, CA (US)

( * ) Notice: Subject to any disclaimer, the term of this patent is extended or adjusted under 35 U.S.C. 154(b) by 189 days.

(21) Appl. No.: 12/832,042

(22) Filed: Jul. 7, 2010

(65) Prior Publication Data

US 2012/0007555 A1 Jan. 12, 2012

(51) Int. Cl.
*H02J 7/02* (2006.01)
*H02J 7/00* (2006.01)

(52) U.S. Cl.
USPC ............ 320/111; 320/110; 320/113; 320/115

(58) Field of Classification Search
USPC .................................................. 320/110, 111
See application file for complete search history.

(56) References Cited

U.S. PATENT DOCUMENTS

| | | | | |
|---|---|---|---|---|
| 3,813,640 A | * | 5/1974 | Carissimi ....................... | 439/655 |
| 4,897,049 A | * | 1/1990 | Miller et al. ................... | 439/365 |
| 5,073,681 A | * | 12/1991 | Hubben et al. ................. | 174/66 |
| 5,648,712 A | * | 7/1997 | Hahn ............................. | 320/111 |
| 6,034,505 A | * | 3/2000 | Arthur et al. .................. | 320/113 |
| 6,118,643 A | * | 9/2000 | Dyer et al. ..................... | 361/111 |
| 2009/0267559 A1 | * | 10/2009 | Toya et al. ..................... | 320/108 |
| 2011/0187323 A1 | * | 8/2011 | Gourley ........................ | 320/111 |

* cited by examiner

*Primary Examiner* — M'Baye Diao
(74) *Attorney, Agent, or Firm* — Gregg P Hart

(57) ABSTRACT

An apparatus for providing electricity to a portable electronic device comprising: a wall plate that surrounds and attaches to an electrical wall receptacle, a charging cradle with a platform for supporting a portable electronic device; a male charging connector coupled to an opening slot in the charging cradle's platform, wherein the charging connector is insertable into a female charging port of a portable electronic device; and a transformer circuit coupled to the male charging connector, wherein the transformer circuit transforms a receiving electricity to an output electricity having an output voltage, an output current and an output wattage wherein the output electricity is within a range sufficient for charging the portable electronic device.

31 Claims, 13 Drawing Sheets

SMART WALL PLATE

FIELD OF THE INVENTION

This invention relates to a charging apparatus for providing electrical power to portable electronic devices, and more specifically to a electrical wall plate having one or more charging apparatuses attached in such a way to provide for the charging of a portable electronic device around the perimeter of a light switch, electrical receptacle or other electrically terminated device commonly found in residential or commercial dwellings.

BACKGROUND OF THE INVENTION

In today's word of portable electronic devices, many people have one or more devices, such as smart phones, portable music players, electronic reading tablets, GPS to name a few. In order to keep these devices powered, it is necessary to charge them at regular intervals through the use of a power adapter that plugs into a wall receptacle or through a cable which can be coupled to a computer. In order to charge these devices, an unoccupied wall receptacle or computer port is needed. With the number of electronic appliances using wall receptacles within a dwelling, it is often difficult to find and keep organized all the required charging components and to find an available wall receptacle given the growing competition for such outlets—especially in older homes with fewer outlets.

Further, portable electronic devices require a charging cable. If a wall receptacle is being used, the charging devices also require a transformer and/or an AC/DC converter to step down standard 110 or 220 Volt alternating current ("VAC") electricity to a level acceptable to the portable electronic device. These transformers are often bulky, non descript boxes that are easily misplaced or lost when travelling. These transformer/converting devices are also often specific to particular voltage/current needs of the devices they charge.

Additionally, a portable electronic device requires tabletop space to rest on while charging. When an individual has multiple portable electronic devices, a nightstand, end table or the like can be cluttered with cords and devices, thus taking up valuable horizontal real estate within one's dwelling.

Lastly, with portable electronic devices lying on a table or even on the floor, a person cannot easily view the device's display while it is charging. Many devices have wireless capability permitting them access to the Internet or other communication networks. Such devices may be capable of displaying useful information while they are being charged and/or in standby mode.

As such, a charging apparatus is needed that is capable of providing the charging functionality of a standard charger while overcoming the limitations described above.

SUMMARY OF THE INVENTION

In one embodiment of the present invention, an apparatus for providing electrical power to a portable electronic device is described. The apparatus comprises a wall plate for surrounding and coupling to an electrically terminated receptacle. The apparatus further comprises a charging cradle with a resting platform for physically supporting the portable electronic device. The charging cradle is attached to the edge of the wall plate. The apparatus also comprises a male charging connector coupled to an opening slot of the charging cradle. The male charging connector may be inserted into a female charging port of the portable electronic device. Lastly, the apparatus comprises a transformer circuit coupled to the male charging connector. The transformer circuit receives an electrical signal with a receiving voltage range of 85-265 volts and an alternating current. The transformer circuit transforms the electrical signal to a stepped down electrical signal sufficient for charging the portable electronic device.

The present invention also discloses a method of manufacturing a smart wall plate. First, a receiving electrical signal having a receiving range of 85-265 volts and an alternating current is determined. Next, an output electrical signal is determined. The output electrical signal has an output voltage, an output current, and an output wattage, wherein the output electrical signal is within a predetermined range sufficient for charging a portable electronic device. Next, a transformer circuit is assembled, wherein the circuit is capable of receiving the receiving electrical signal and outputting the output electrical signal to the portable electronic device. A wall plate is manufactured that surrounds and couples to an electrically terminated receptacle. A charging cradle is also manufactured. The charging cradle has a resting platform for physically accommodating the portable electronic device. The resting platform also has an opening slot where a male charging connector may extend through the opening slot. The charging cradle may also attach to the outer edge of the wall plate. Lastly, a male charging connector is manufactured, wherein the connector may be inserted into a female charging port of a portable electronic device. The male charging connector is attached to an output end of the transformer circuit so that the male charging connector may receive the output electrical signal.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

DETAILED DESCRIPTION

Figure 1:
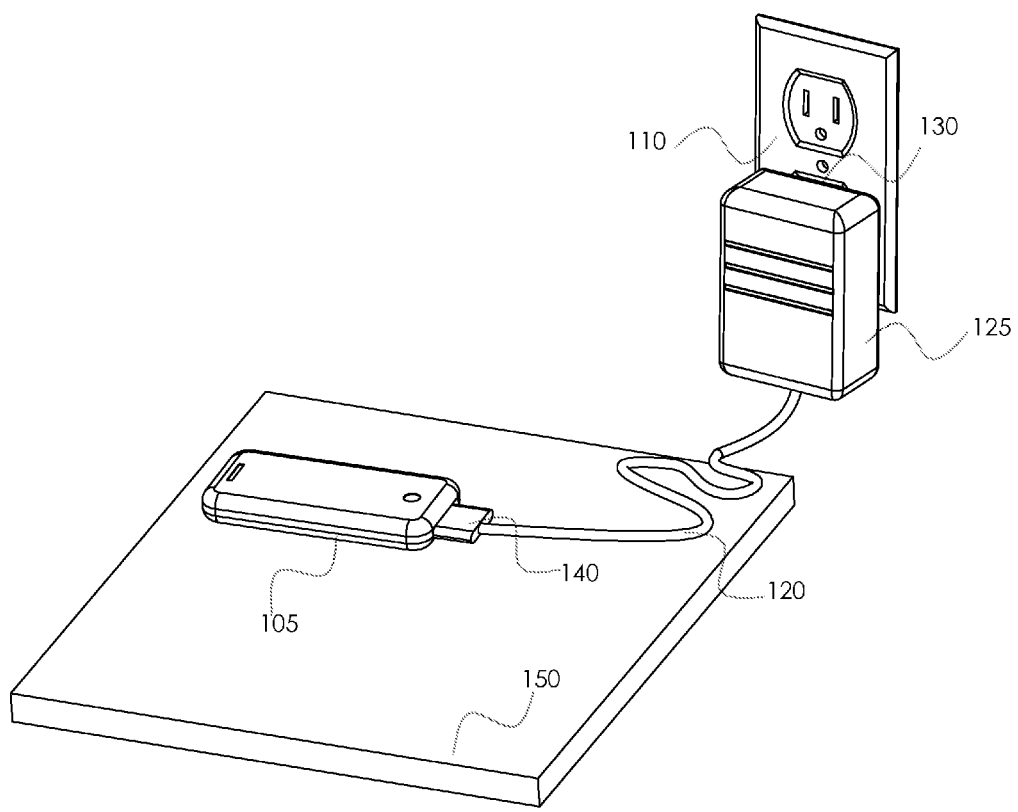
FIG. 1 illustrates a view of a typical portable electronic device using a now common charging cable and transformer.

FIG. 1 illustrates a prior art view of a traditional charging apparatus as commonly used. In order to charge portable electronic device 105, a standard electricity wall receptacle 110 is needed. A charging cable 120 is then plugged into a transformer 125 that further plugs into one of the available connection inputs 130 of the wall receptacle 110. Since the electricity coming from the connection input 130 is commonly between 110 Volts and 220 Volts of alternating current, a transformer 125 is used to step down and transform the voltage and current so that it is usable by the portable electronic device 105. The output end of the charging cable 120 is then inserted into the charging contacts 140 of the portable electronic device 105. Additionally, in this example the portable electronic device typically must rest on the floor or some horizontal surface such as a table 150, thus using valuable horizontal real estate within a dwelling.

Figure 2A:
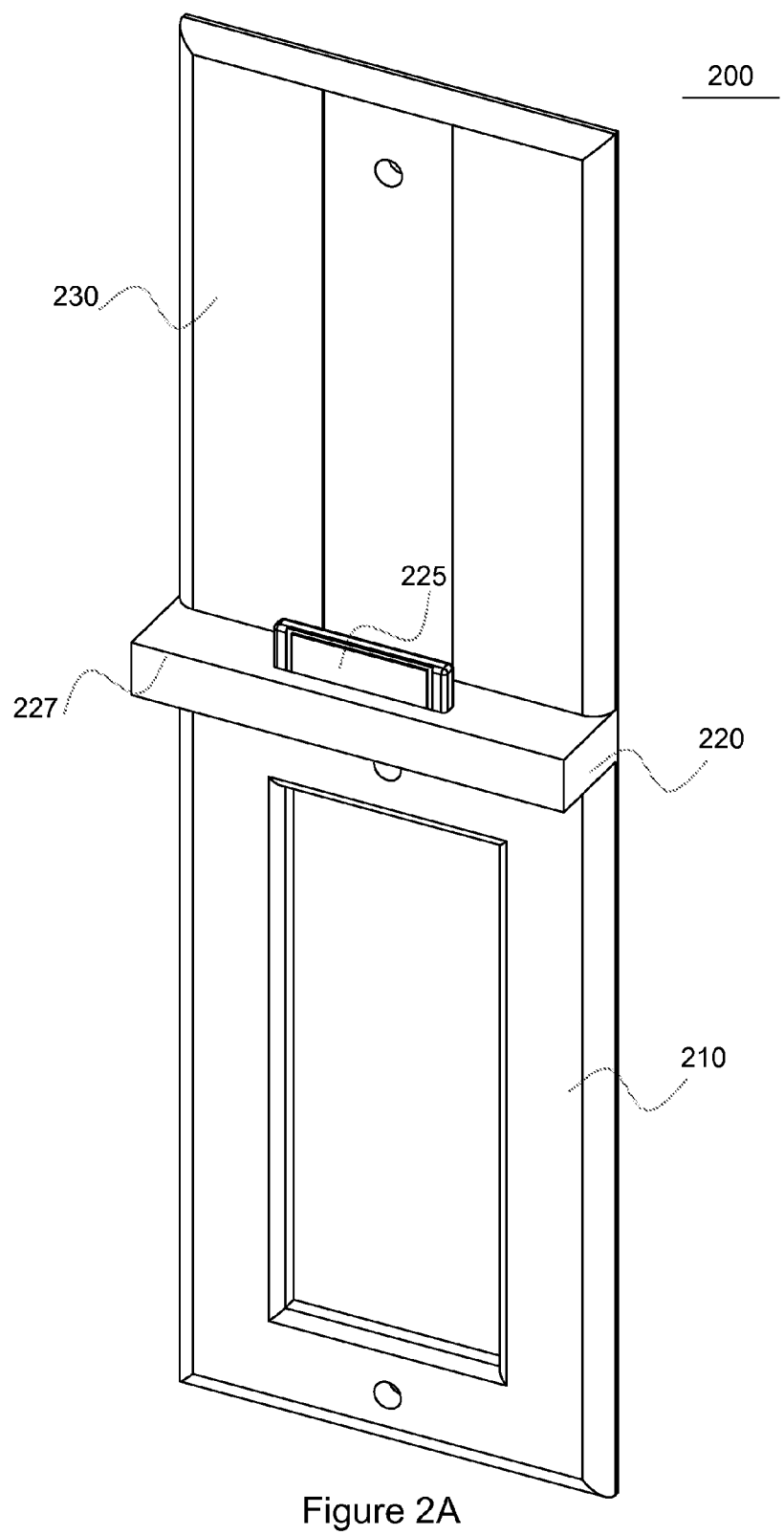
FIG. 2A illustrates one embodiment of a smart wall plate which includes a charging cradle for a portable electronic device.

According to several embodiments, the present invention as depicted in FIG. 2A illustrates one embodiment of a smart wall plate which includes a charging cradle for a portable electronic device. In this embodiment, smart wall plate 200 combines a wall plate 210 with a charging cradle 220, wherein the wall plate 210 may be secured to and form a perimeter around an electrical receptacle. Throughout this application, the term "electrical receptacle" may refer to any component where electricity terminates, is switched, or altered in some manner. Such a component may transmit or receive electricity and/or electrical data signals in either an analog or digital format. Examples of an electrical receptacle may include, but are not limited to, a wall socket or receptacle, light switch, telephone jack, computer network jack, audio/visual input or output (e.g., HDM, speaker wire, S-Video, composite video, etc.), and thermostats to name a few. Additionally, any of the previously mentioned examples may be located within or on any surface including walls, ceiling, floors and even moveable fixtures such as furniture. As shown in FIG. 2A, wall plate 210 is a one Gang light switch.

Charging cradle 220 is an extension of the wall plate 210. In one embodiment, the charging cradle may be permanently affixed to the wall plate 210 with the entirety of the wall plate 210 being a single piece.

Charging cradle 220 further comprises a charging connector 225 that may be inserted into a portable electronic device typically for charging. In one embodiment, the charging connector 225 comprises a male terminated proprietary connector that may be inserted into a female terminated receptor of a specific type or brand of portable electronic device. In one example, the charging connector 225 may be inserted into an APPLE™ IPHONE™ or IPOD™ or IPAD™. Once a portable electronic device is coupled to the charging connector 225, the device is able to rest on a cradle footing 227 of the cradle 220, permitting the device to rest in a substantially vertical position. In another embodiment, the charging cradle 220 may further comprise a cradle backing 230, which may further assist in maintaining the portable electronic device in a substantially vertical resting position.

In another embodiment, a charging cradle 220 may be used to charge a portable electronic device that normally rests in a different orientation than the above example. With such a device any of charging connector 225, cradle footing 227, or cradle backing 230 may be in a different orientation to correctly apply support to the portable electronic device.

In another embodiment, the charging cradle 220 may be non-permanently coupled to the wall plate 210, such that the charging cradle 220, the charging connector 225, the cradle footing 227 and the optional cradle backing 230 may be removed from the wall plate 210. In other words, a wall plate 210 may accept a variety of different charging cradles 220, charging connectors 225, cradle footings 227 and cradle backings 230. A non-permanent charging cradle may couple to wall plate 210 through fasteners, hinged connectors, adhesives to name a few. One skilled in the art can appreciate that numerous methods may be implemented to non-permanently couple a charging cradle 220 to a wall plate 210.

Figure 2B:
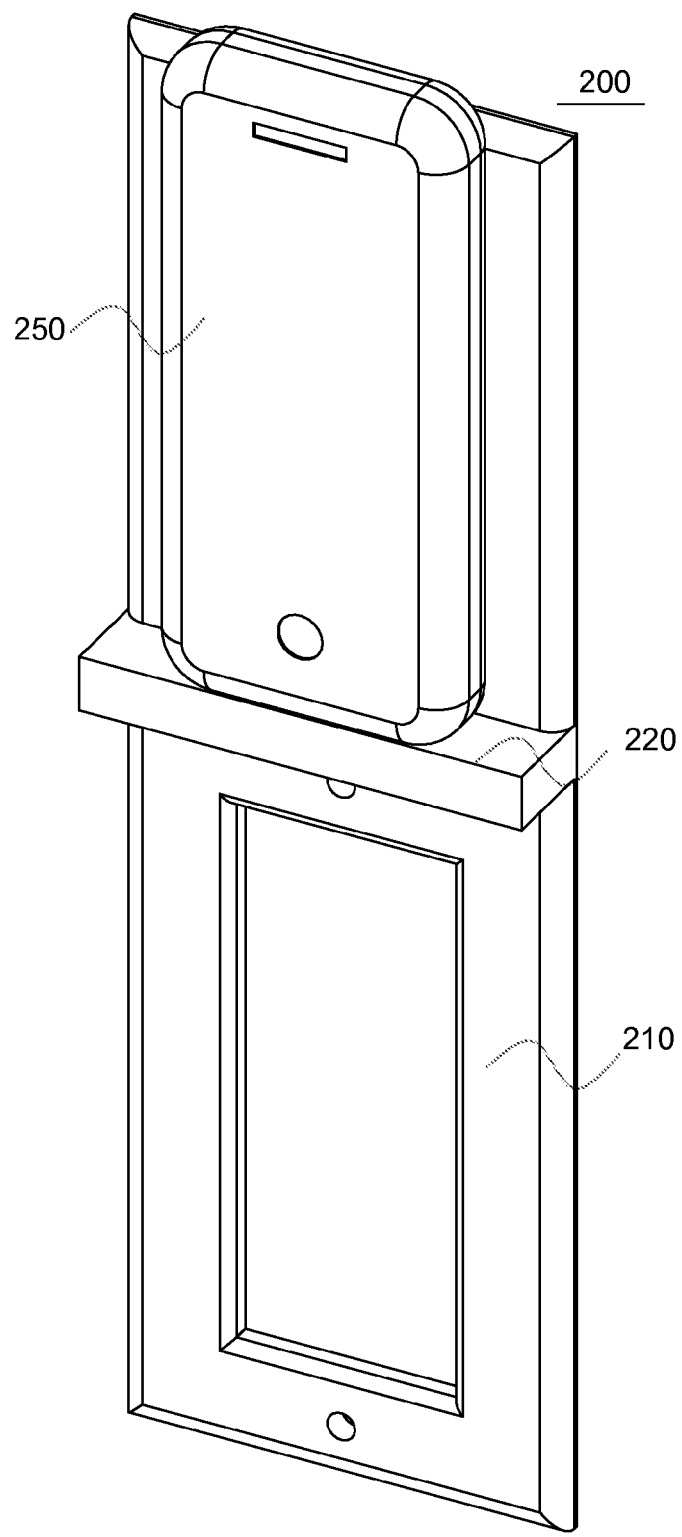
FIG. 2B illustrates the smart wall plate and its charging cradle with a portable electronic device being charged.

FIG. 2B illustrates a smart wall plate 200 comprising the wall plate 210 and a charging cradle 220 with a portable electronic device 250 being charged while resting on the charging cradle. In this example, an APPLE™ IPHONE™ is vertically resting on the cradle footing of the charging cradle 220. In this example, the portable electronic device 250 may be charged while resting in such an orientation where the device's display is readable. Additionally, horizontal real estate, such as a table or counter, remains free for other uses.

Figure 3:
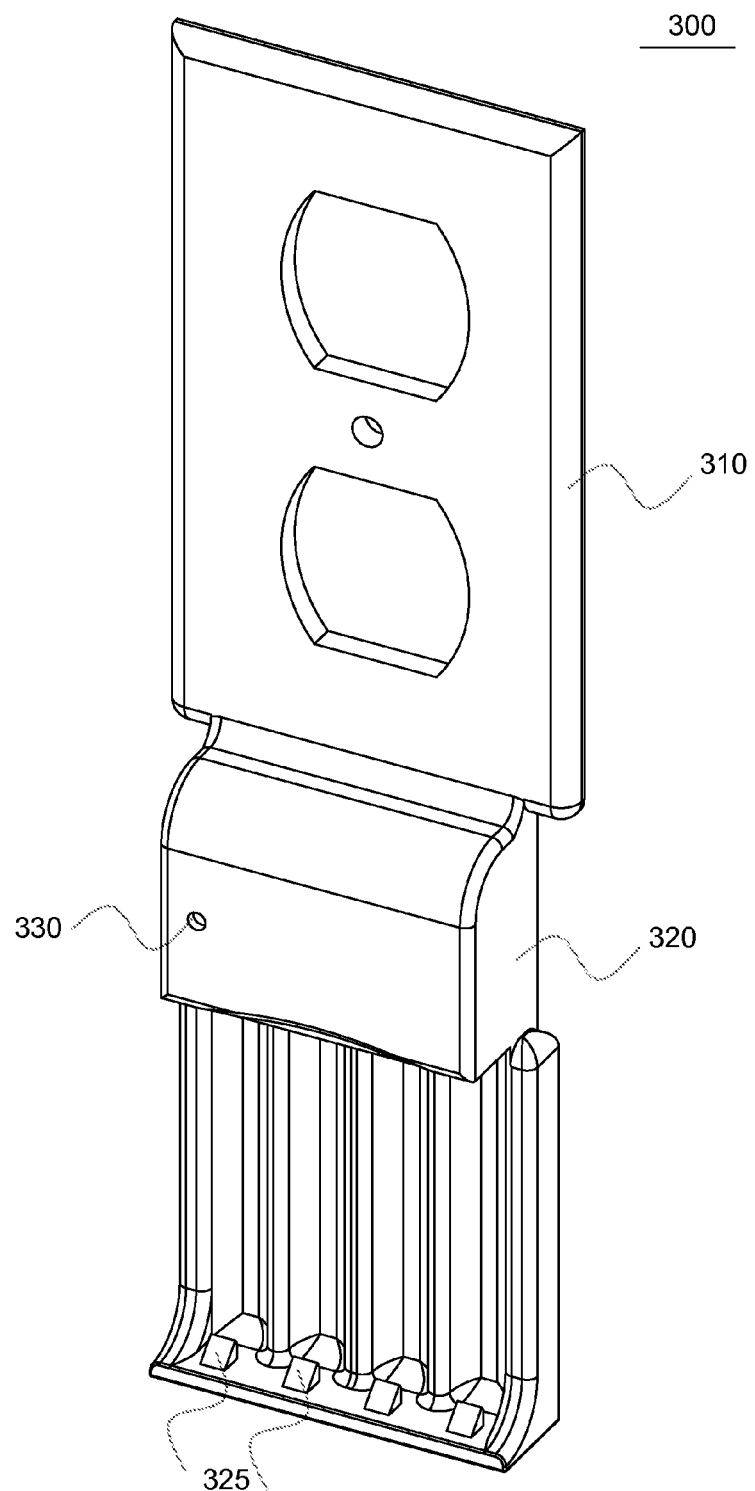
FIG. 3 illustrates another embodiment of a smart wall plate which includes a battery charger.

FIG. 3 illustrates another embodiment of a smart wall plate, which includes a battery charger. In this embodiment, smart wall plate 300 comprises a wall plate 310, which, in this example, consists of a one Gang, multi-outlet receptacle. Smart wall plate 300 comprises a battery charger 320 capable of charging standard rechargeable AA and/or AAA batteries. In one embodiment, the circuitry used to provide the expected electrical voltage, wattage and current to charge a rechargeable battery, may be directly attached to the battery charger 320 portion of the smart wall plate 300. In another embodiment, the circuitry may be indirectly coupled to the battery charging portion of the smart wall plate 300. For example, the circuitry may be stored within the gang box of the wall plate with electrical wires coupling the circuitry to the battery charger 320. Further discussion of the circuitry used to provide electrical power to a smart wall plate 300 are described in FIG. 4.

Battery charger 320 further comprises electrical contacts 325 used to transmit an appropriate electrical signal to the charging contacts of a battery. In one embodiment, battery charger 320 may be capable of charging the secondary cells of lead acid, nickel cadmium (NiCd), nickel metal hydride (NiMH), lithium ion (Li-ion), and lithium ion polymer (Li-ion polymer) batteries. However, battery charger 320 may further be capable of charging additional types of rechargeable batteries.

In another embodiment, battery charger 320 may be capable of charging different sizes of rechargeable batteries such as C, D, 9-volt, CR123, CR2, CR-V3 to name a few. Further, many portable electronic devices have removable proprietary batteries. For example, many camera manufacturers such as SONY™, CANON™, and NIKON™ use proprietary batteries that are not interchangeable with other manufacturers. As such, differing embodiments of battery charger 320 may allow for charging of such batteries.

In another embodiment, battery charger 320 may further comprise one or more visual indicators 330 useful for indicating when batteries have been charged.

Figure 4A:
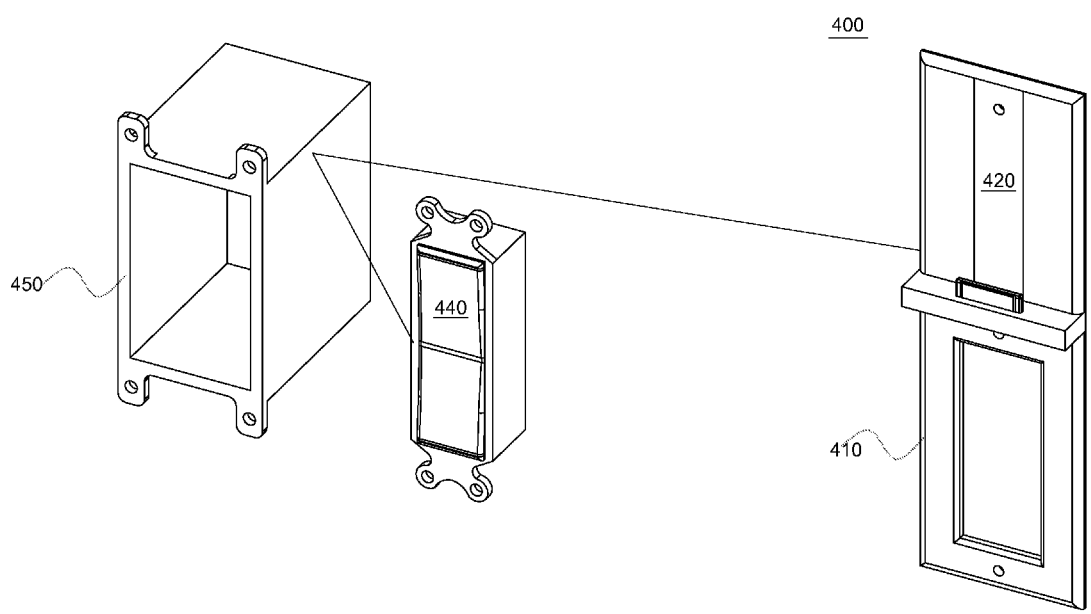
FIG. 4A illustrates a perspective view of one embodiment of the components which comprise a smart wall plate.

FIG. 4A illustrates a perspective view of one embodiment of the components comprising a smart wall plate. In one embodiment, a smart wall plate 400 comprises a wall plate 410 and a device charging cradle 420. The device charging cradle 420 further includes a transformer component (not shown). Additionally, the wall plate 410 and the charging cradle 420 mechanically couple to a standard electrical wall box 450 and electrically couple to 1) power wire within an electrical box; or 2) power wire connected to an electrical socket 440 or other electrical power receptacles components such as a power plug, a rocker light switch 440, or a dimmer switch, to name a few.

In one embodiment, the wall plate 410 is an injection molded plastic plate that covers the electrical wall box 450 and the electrical light switch 440. Charging cradle 420 may also be manufactured from injection-molded plastic of the same or a differing type and color as the accompanying wall plate 410. In another embodiment, both the wall plate 410 and/or the charging cradle 420 may be manufactured from other materials such as fiberglass, aluminum, stainless steel, wood, and others to name a few.

In one embodiment, the charging cradle 420 may be permanently coupled to the wall plate 410 such that they become a single unit. In another embodiment, the device cradle 420 may non-permanently couple to the wall plate 410 permitting charging cradle 420 be removed from the wall plate 410. With such an embodiment, different types of charging cradles may be interchangeable. In other words, a single wall plate may accept a plurality of differing charging cradles, thus permitting a plurality of differing types or brands of portable electronic devices to be charged from a single wall plate 410. In yet another embodiment, the wall plate 410 and the charging cradle 420 may be manufactured from a single piece of injection molded plastic or other material.

As previously described in FIG. 2A, charging cradle 420 further comprises a charging connector insertable into a portable electronic device as a mode of providing electrical power to the device. In order for the charging connector to transmit an appropriate electrical signal, a transformer component is provided. In one embodiment, the transformer component comprises one or more electrical circuits arranged in a manner to transform standard electricity coming from a dwelling's internal electrical wires into electricity acceptable by the portable electronic device to be charged. For example, many commercial and residential dwellings within the United States have 110 VAC electricity running throughout the walls. The transformer component may receive a 110 VAC electrical signal and transform the standard signal into a DC signal appropriate for charging a portable electronic device. Throughout this application, the terms "electricity" and "electrical signal(s)" may be used interchangeably.

In order for the transformer component to receive an electrical signal from within a dwelling, the transformer is coupled to the dwelling's electrical supply. In one embodiment, the transformer may receive the electrical supply from the electrical wires found within an electrical wall box 450. In most dwellings, electrical wires are feed into and terminate in each electrical wall box. These wires normally couple to the terminals of a household electrical receptacle such as a light switch 440. In one embodiment, the electrical wires may branch off and additionally couple to the inputs of the transformer component. Such a branch may occur such that two pairs of electrical wires exist with one pair coupling to the terminals of the wall socket 440 and the other pair coupling to the inputs of the transformer component. In another embodiment, the electrical wires from the wall box 450 do not branch off into two pairs. Instead, the electrical wires from the wall box 450 may couple to the terminals of the wall socket 440 with a second set of wires branching from the wall socket's 440 terminals and coupling to the inputs of the transformer component.

In one embodiment, the transformer component's circuitry is contained within the charging cradle 420 such that the charging cradle and the transformer component are a single unit. The circuitry of the transformer component may be contained in a hollow portion, on the back side, of the charging cradle 420. For example, cradle footing 227 (from FIG. 2A) may have sufficient depth and height to accept the circuitry. Such a configuration permits for the circuitry to be confined within the charging cradle 220, while permitting the adjacent wall to isolate the circuitry from inadvertent contact with external devices, wires or the like. In another embodiment, a backing may exist on the charging cradle to enclose the circuitry from external contact. In such an embodiment, electrical wires may protrude from the backing for connection to the electrical wires from the wall box.

In another embodiment, the transformer component may be external to the smart wall plate, such that the transformer component may be placed inside the electrical wall box 450. In such an embodiment, the transformer component further comprises an external housing for isolating the internal circuits from inadvertently making contact with the electrical power wires. The available internal space within a standard one Gang electrical wall box may be used to contain the transformer component. Two Gang or larger electrical wall boxes provide additional internal space to permit the storage of two or more transformer components. The output end of the transformer component couples to the charging connector of the charging cradle 420.

Figure 4B:
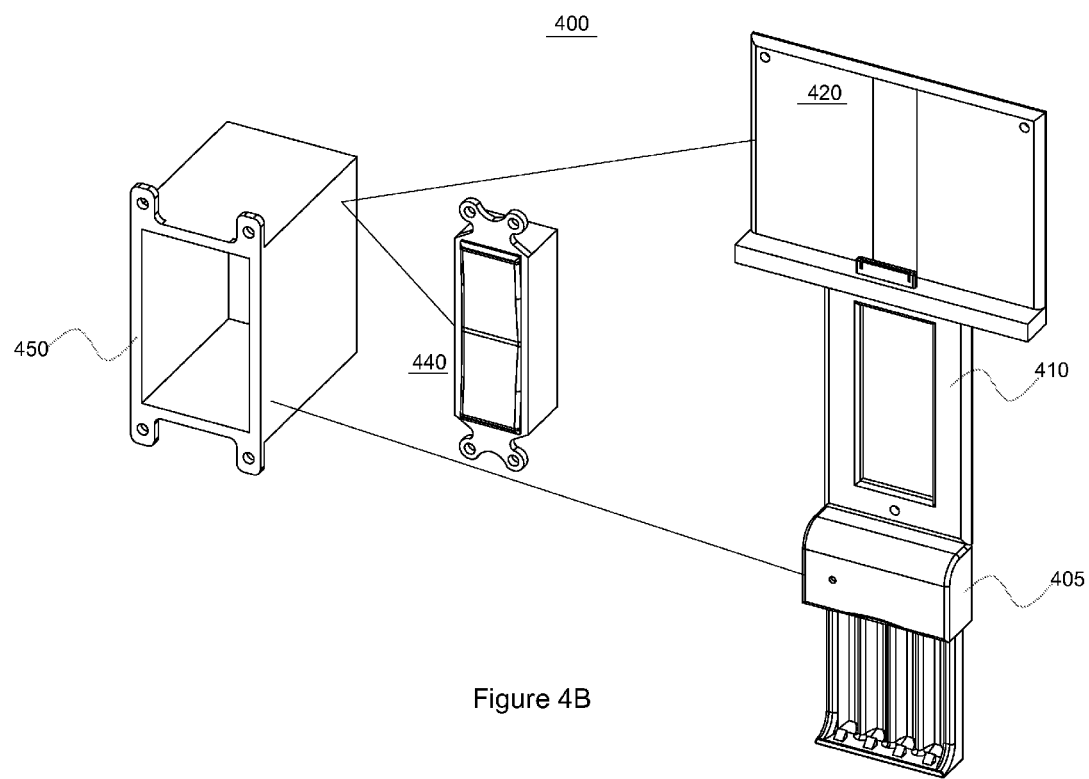
FIG. 4B illustrates a perspective view of another embodiment of the components which comprise a smart wall plate.

FIG. 4B illustrates a perspective view of another embodiment of the components comprising a smart wall plate. In addition to the smart wall plate 410 having a charging cradle 420, it also includes a battery charger 405. In this embodiment, transformer component may be contained behind charging cradle 420 or behind battery charger 405. In either configuration, the transformer component couples to the charging connectors of both the charging cradle 420 and the battery charger 405. In such an embodiment, the electrical requirements (e.g., voltage, wattage and amperage) of both the charging connector and the battery charger may be substantially similar. In other words, the transformer component 430 would be providing the same power requirements to both the charging connector and the battery charger.

In another embodiment, two or more transformer components may be utilized for a single smart wall plate 400. Such a scenario may be useful when the power requirements (e.g., voltage, wattage and amperage) differ between a charging connector (and the portable electronic device it charges) and an add-on component such as a battery charger. In this scenario, two separate transformer components may be provided, with each one outputting different power requirements. In such an embodiment, both transformer components may be contained in a single location behind either the charging cradle 420 or the add-on component. In another embodiment, each transformer component may be contained behind their respective charging cradles 220 and add-on component. In yet another embodiment, both transformer components may be contained in one or more transformer housings stored within the electrical wall box 450.

Figure 5A:
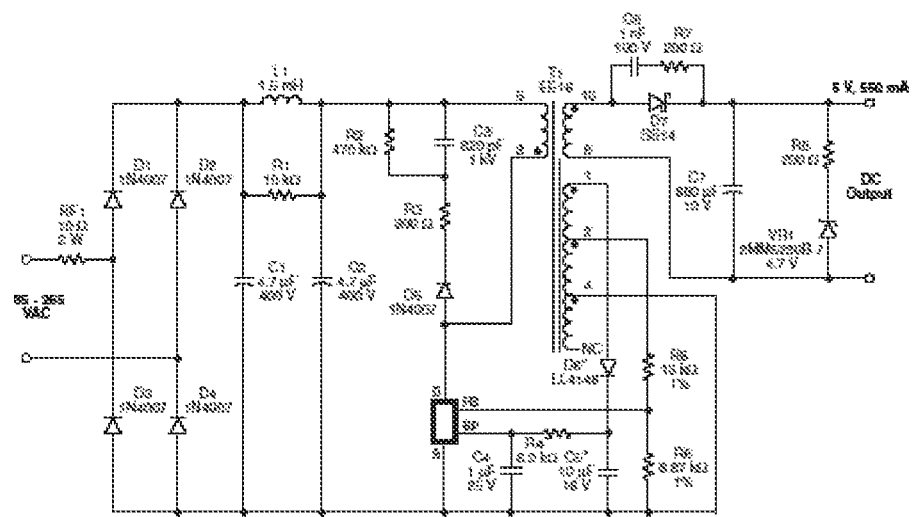
FIG. 5A illustrates one embodiment of an electronic converter/transformer component.

FIG. 5A illustrates one embodiment of a transformer component 500 comprising one or more electrical circuits for converting a 110 VAC signal to a level appropriate for a portable electrical device. In this embodiment, transformer component 500 may accept an AC electrical signal between 85-265 volts. The output signal of the transformer component 500 provides a 5 VDC, 2.75 W, 550 mA signal. Such an output signal is appropriate to charge many devices that are traditionally charged from a Universal Serial Bus ("USB") charging adapter as well as an APPLE™ IPOD™, IPAD™ and IPHONE™. As one skilled in the art can appreciate, the components illustrated in transformer component 500 are merely an example of how to convert an 85-265 VAC electrical signal to a 5 VDC, 2.75 W, 550 mA signal. As such, this example should not be construed as limiting, but rather as one of many types of circuits that may arrive at substantially the same resulting output signal.

As previously stated, in order to protect the circuits of transformer component 500 from inadvertent contact with other wires, an external housing may be utilized to isolate the circuit components from electrical short circuits, electrical or other types of damage or outside interference while the unit rests within the electrical wall box.

Figure 5B:
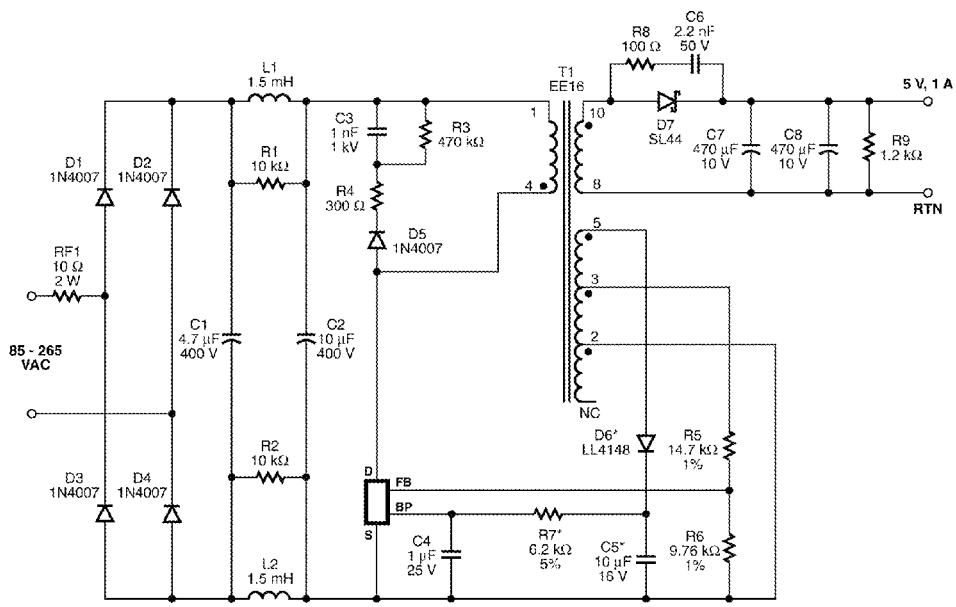
FIG. 5B illustrates another embodiment of an electronic converter/transformer component.

Not all portable electronic devices are capable of being charged from the same voltage, wattage and current as the example provided in FIG. 5A. As such, the circuit of transformer component 500 may be altered to provide varying electrical outputs. For example, FIG. 5B illustrates another embodiment of a transformer component 550 capable of receiving a 85-265 VAC electrical signal and converting it to a 5 VDC, 5 W, 1 A output signal. As with transformer component 500, transformer component 550 is merely one example of a transformer circuit for converting a 110 VAC signal to a 5 VDC, 5 W, 1 A signal. Many other circuits may be used to arrive at substantially the same resulting output signal. Hence, the example used in transformer component 550 should not be construed as limiting or exclusive.

Many portable electronic devices include female-oriented charging ports or contacts as this orientation does not require an externally protruding piece that may increase the external dimensions of the device. With such a device, the terminated end of a charging cable is a male-oriented connector, which may be inserted into the portable device's female port or contacts. As such, a charging connector of the present invention may provide a substantially similar male-oriented connector, which may be inserted into the female-oriented charging port of a portable device much like a traditional charging cable. However, in another embodiment, a charging connector may be a female-oriented connection port capable of receiving a male-orientated charging connector from a portable electronic device. In other words, the charging connector of a smart wall plate may be either a female or a male connector.

In order to standardize charging connectors of portable electronic devices, much of the electronics industry has agreed on using mini-USB connectors and/or USB electrical requirements as the preferred charging input. Further, this standard permits many portable electronic devices to be connected to a personal computer where a single USB cable can allow for the transmission of data as well as simultaneously charging the portable electronic device. This standard has permitted many charging cables and their associated transformer to be cross compatible with a number of portable electronic devices of varying types and manufacturers. Additionally, with the standardization of USB-based charging cables, many differing devices are able to accept similar voltage, wattage and current requirements as well. In other words, a USB-terminated charging cable and its associated transformer may be capable of charging portable devices from many different manufacturers. Hence, a smart wall plate that can accommodate this standard, by implementing a USB-based charging connector, would be beneficial. In another embodiment, a smart wall plate may also implement a mini-USB or micro-USB charging connector. Such connectors are slightly smaller in size than a standard USB connector, while offering similar standardization and electrical signal requirements as standard USB connectors. Additionally, IEEE 1394 or eSATA connectors may be used to provide power to devices that use these connection standards.

In another embodiment, instead of having a charging cradle terminate with a fixed position charging connector, the charging cradle may terminate with an actual cable having an appropriate charging contact (e.g., USB, proprietary, etc.). Such an embodiment proves useful when the orientation of a portable electronic device's charging port is oriented on the side, top or back of the device and a user wishes the device's orientation to remain upright while charging. For example, the BLACKBERRY™ TOUR™ smart phone has its charging port on the side of the device instead of the bottom. As such, the smart phone must be oriented on its side while being charged, if a fixed position charging point is used. However, with a charging cradle terminating with a cable, the smart phone may still remain in an upright position.

With the recent increase in development of electronic book readers (e.g., IPAD™, AMAZON'S™ KINDLE™, and BARNES AND NOBLES'™ NOOK™) and tablet computers, the size and weight of portable electronic devices are increasing. A smart wall plate as described above may have difficulty accommodating the additional size and weight of such devices.

Figure 6:
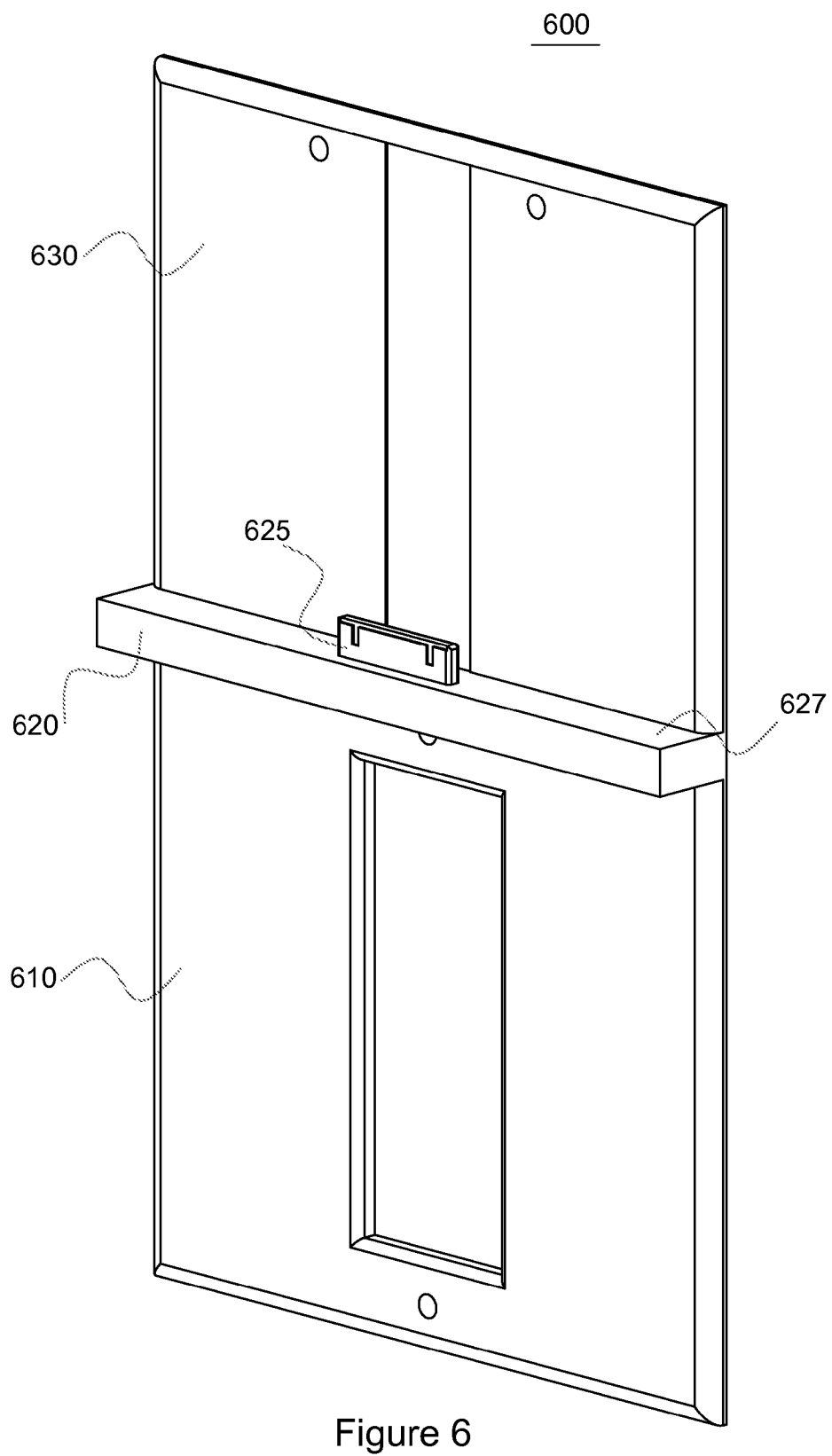
FIG. 6 illustrates another embodiment of a smart wall plate useful for charging larger portable electronic devices.

FIG. 6 illustrates another embodiment of a smart wall plate capable of accommodating a larger portable electronic device such as an APPLE™ IPAD™. Smart wall plate 600 comprises a wall plate 610, a charging cradle 620, a charging connector 625, a cradle footing 627, and a cradle backing 630. In order to accommodate a larger and heavier portable electronic device, both the cradle footing 627 and the cradle backing 630 may also have larger dimensions. In another embodiment, the cradle backing 630 may also be secured to the wall to provide additional support through adhesives, dry wall anchors, or fasteners secured into a wall stud. The additional structural support would permit the smart wall plate to accommodate larger and heavier devices.

Many portable electronic devices have wireless capabilities, thus, permitting communication with the Internet or other communication networks. Users of such a device may wish to simultaneously charge the device in a smart wall plate and receive real-time information through the device's wireless capabilities. For example, an IPAD™ may be charged on a smart wall plate as well as display real time news feeds, RSS feeds, emails, weather or other types of information. Depending on the type of portal electronic device, its internal settings may need to be altered to permit the device's display to remain lit and active while the device itself is being charged. If such a device's display is not capable of remaining indefinitely lit while being charged, a software program may be installed onto the device to add such functionality. In result, a smart wall plate coupled to a light switch is now able to provide a near eye level information display panel—an information dashboard—while simultaneously charging the device.

Figure 7:
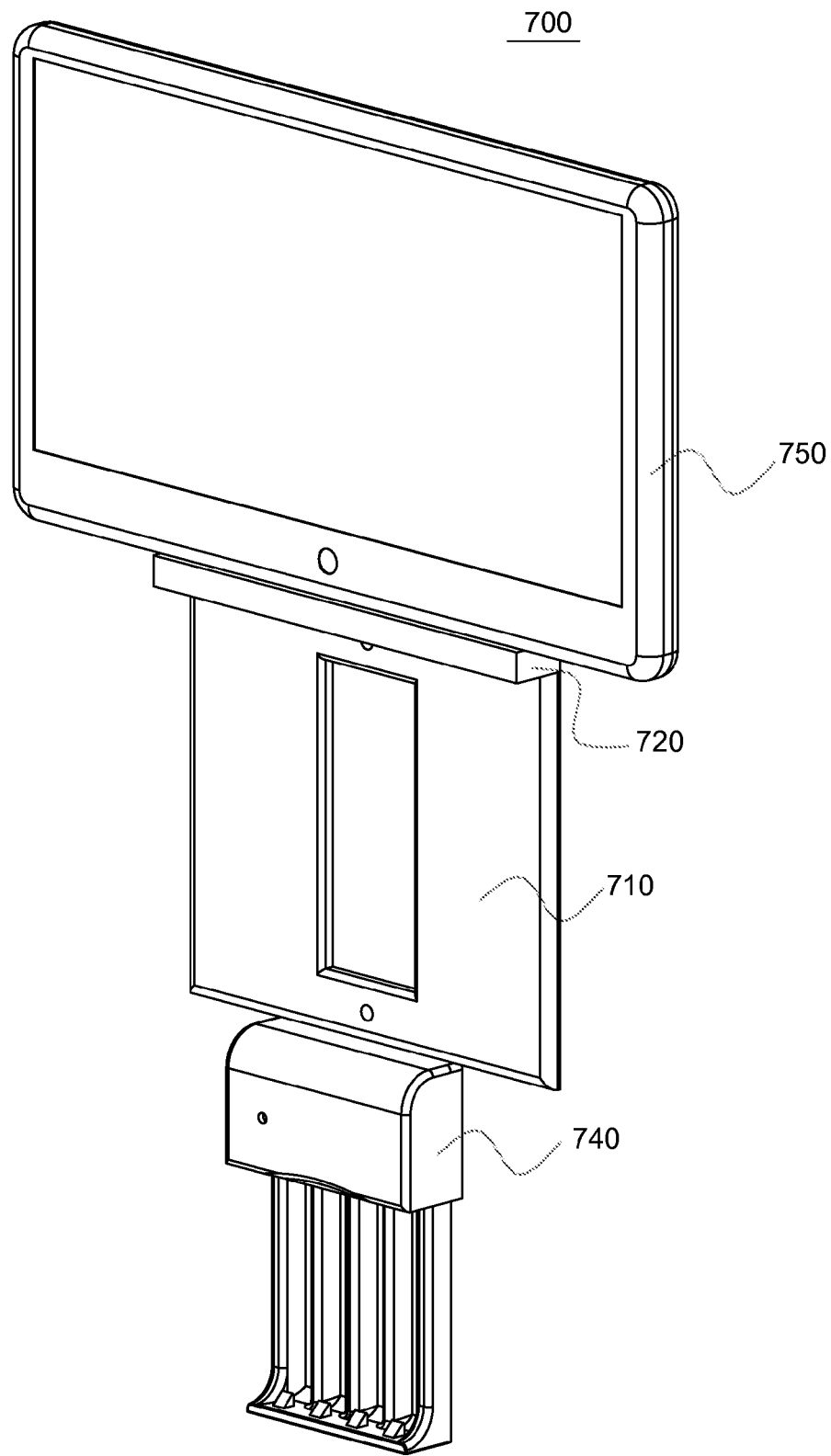
FIG. 7 illustrates an embodiment of another smart wall plate with an electronic device charging cradle and a battery charger.

In another embodiment, a smart wall plate may be capable of providing multiple functions such as a charging cradle for a portable electronic device as well as one or more additional functional auxiliary device. FIG. 7 illustrates a smart wall plate with a charging cradle and a battery charger. Specifically, smart wall plate 700 comprises a wall plate 710 having a charging cradle 720 coupled to the upper edge of the wall plate 710. In this example, an APPLE™ IPAD™ is resting on the charging cradle 720. Additionally, the wall plate 710 also comprises a battery charger 740 coupled to the bottom edge of the wall plate 710. The battery charger is capable of charging multiple AA or AAA rechargeable batteries. Such an embodiment permits simultaneous charging of a portable electronic device and rechargeable batteries. Such a device combination may be placed on single or multiple gang smart wall plates.

In another embodiment, a smart wall plate may comprise a single wall plate with a charging cradle or additional auxiliary devices on the upper edge, the bottom edge, the left edge and the right edge of the wall plate. For example, a single smart wall plate may comprise a wall plate coupled to a light switch with a charging cradle for charging an IPAD™, a charging cradle for charging a BLACKBERRY™, a battery charger and a night light.

In other embodiment, a smart wall plate may have additional auxiliary devices such as a temperature display, carbon monoxide monitor, smoke detector, volume control for an audio-visual system, motion sensor and alarm, or a rechargeable flash light to name a few combined on one smart wall plate or separate per wall plate.

In another embodiment, a smart wall plate may forego an external transformer component and the need for power coming directly from electrical wires within an electrical wall box. In such an embodiment, a smart wall plate may have a two or three-pronged male electrical plug that plugs directly into a wall socket. Such a smart wall plate may also have any necessary transformers and/or step-down circuits internally housed within the smart wall plate itself. Such a wall plate may have one or more charging cradles or other auxiliary devices or add-ons on any of the edges of the plate.

Figure 8:
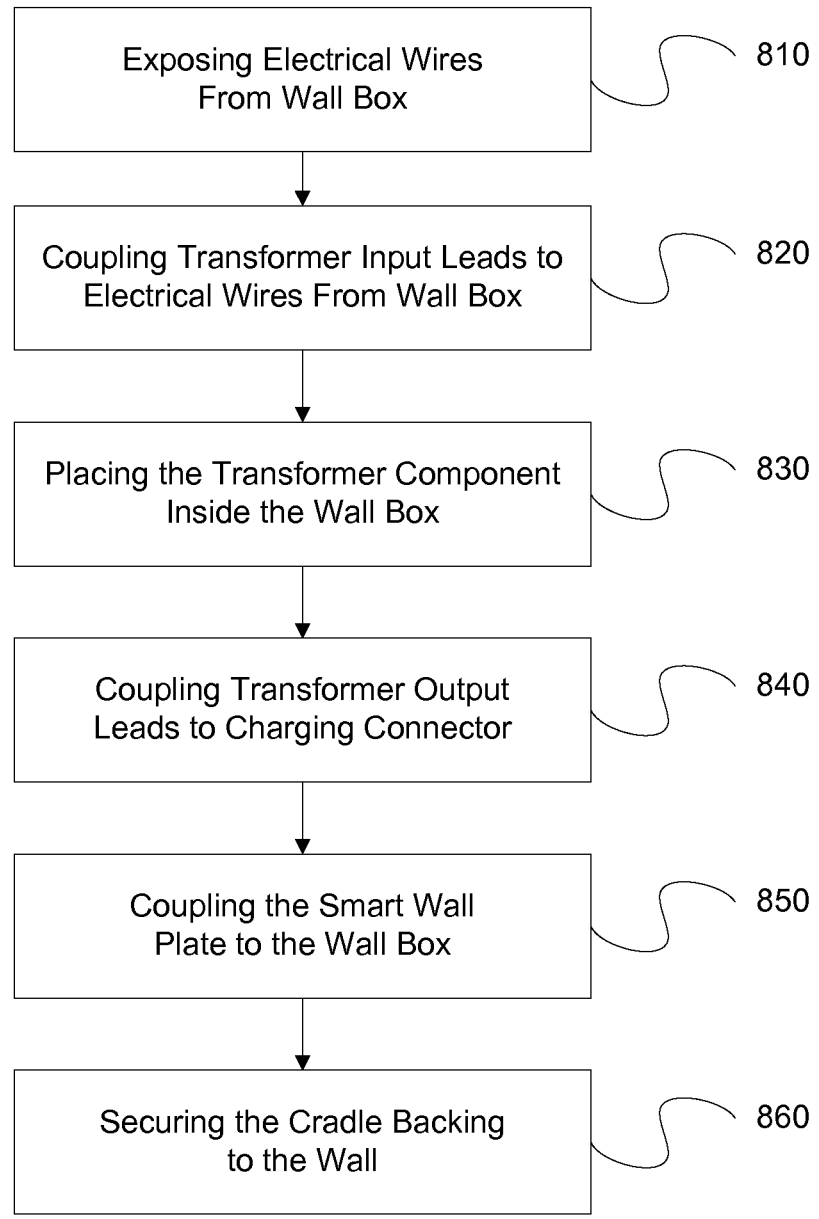
FIG. 8 is a flowchart describing the steps for installing a smart wall plate into the wall of a dwelling.

FIG. 8 is a flowchart describing the steps for installing a smart wall plate into the wall of a dwelling. In order to install a smart wall plate, a wall socket is found mounted on or mounted flush to the wall of a dwelling. First, the electrical wires within an electrical wall box are exposed (step 810). Next, a smart wall plate includes a transformer component for converting or stepping down the electrical signal from the dwelling's wiring. Hence, the input electrical leads of the transformer component are coupled to the electrical wiring in the electrical wall box (step 820). Alternatively, if the transformer component is external to the smart wall plate, the transformer component is placed inside the electrical wall box (step 830). As described above with respect to FIGS. 4A and 4B, the transformer component may be contained inside the smart wall plate. Thus, step 830 is an alternative step if the transformer component is external to the smart wall plate. Next, the output electrical leads of the transformer component are coupled to the charging connector of the charging cradle (step 840). Once this connection is made, the charging connector may receive the converted electricity capable of charging a portable electronic device. Lastly, the smart wall plate is coupled to the electrical wall box (step 850). In one embodiment, the smart wall plate is coupled to the electrical wall box with fasteners such as screws. Optionally, if the portable electronic device to be charged is an electronic book reader, tablet computer or other device of similar size, an appropriately sized smart wall plate may be used as illustrated in FIG. 6. Such a smart wall plate's cradle backing may be secured to the wall in order to support the heavier weight of the portable electronic device. As such, the smart wall plate's cradling backing is secured to the wall (step 860). As previously mentioned the cradle backing may be secured to the wall with adhesive, dry wall anchors or fasteners screwed into the stud within the wall.

Figure 9:
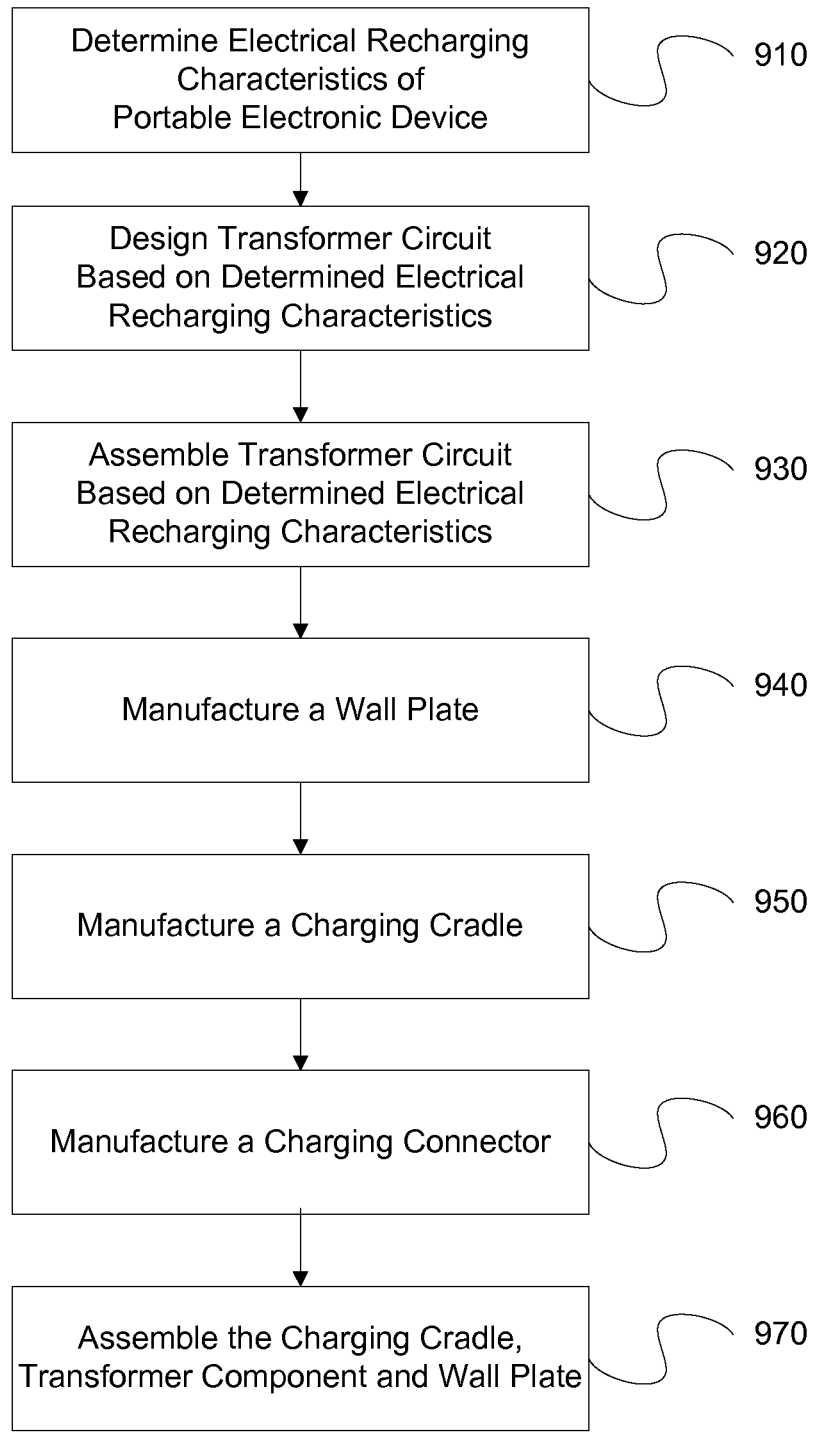
FIG. 9 is a flowchart describing the steps for manufacturing a smart wall plate.

FIG. 9 is a flowchart describing the steps for manufacturing a smart wall plate. In order to manufacture a smart wall plate, the electrical recharging characteristics of the portable electronic device to be charged are determined (step 910). In one embodiment, the voltage, wattage and current of the portable electronic device should be determined. In one embodiment, there are multiple combinations of voltage, wattage and current that may sufficiently charge a portable electronic device or operate a smart wall plate attached device. For example, an IPHONE™ is capable of being charged with a wattage range between 2.75 watts and 5 watts. Although different wattage values may be sufficient to charge an IPHONE™, there may be fluctuations in the time needed to charge its battery. In one embodiment, the electrical recharging requirements of a portable electronic device may be determined by analyzing the internal circuitry of the device's battery or power supply. Additionally, the standard transformer or power supply provided with the portable electronic device may also specify the output voltage, wattage and amperage used to charge the device.

Once the electronic recharging or operating characteristics have been determined, design of one or more transformer circuits occurs (step 920). In one embodiment, a combination of resistors, capacitors, inductors and other electrical components are chosen for designing one or more circuits capable of receiving the electrical signal coming from the dwelling's electrical wires and outputting the determined electrical recharging characteristics from step 910.

Next, the transformer circuit is built (step 930) by assembling the electrical components together in the manner determined in step 920. The transformer circuit may be contained within a hollow portion on the back of a charging cradle of the smart wall plate. The transformer circuit may be isolated from inadvertent contact through the eventual coupling to a wall, or a backing plate. Optionally, a transformer housing may be provided where the complete transformer circuit may be placed within the housing to isolate the circuit from inadvertent contact with other electrical wires or contacts.

Next, a wall plate is manufactured (step 940) in a way to permit its installation around a light switch, power plug, or other common wall receptacles, or other electrical terminating point on or in a wall. In one embodiment, the wall plate may be made from a mold where plastic is injected into the mold to form the shape that fits around a one Gang electrical wall box. In another embodiment, the wall plate may be large enough to fit around a multiple Gang electrical wall box. As with traditional wall plates, one or more holes may exist into the wall plate allowing for fasteners, such as screws, for securing the wall plate to the electrical wall box and/or light switch or receptacle.

Next, a charging cradle is manufactured (step 950) based on the type of portable electronic device chosen for the smart wall plate. The charging cradle may include a horizontally oriented cradle footing acting as a physical support for the portable electronic device. Optionally, a charging cradle may incorporate a cradle backing, clamp, latch, and the link to provide additional vertically oriented physical support to the portable electronic device. In one embodiment, the optional cradle backing may be manufactured in such a way where it may be secured to a wall to provide additional support if the chosen portable electronic device's weight may compromise the smart wall plate's rigidity.

Next, the charging connector is manufactured (step 960) as either a male-terminated or female-terminated connector. The type and orientation of the connector is determinatively based on the type of portable electronic device the smart wall plate is manufactured to accommodate. In other words, a USB, an IEEE 1394, an eSATA or a proprietary connector may be used.

Lastly, the charging cradle, cradle footing, optional cradle backing, wall plate, charging connector and transformer circuit/housing are assembled together (step 970). In order for the charging connector to receive the output electrical signal of the transformer circuit, the charging connector is coupled to the transformer circuit via one or more electrical leads. The charging connector is inserted into the cradle footing in such a way that the connector is exposed for connection with the portable electronic device. The charging cradle couples to the wall plate at one of many edges of the wall plate (e.g., top bottom, left side or right side.)

Figure 10:
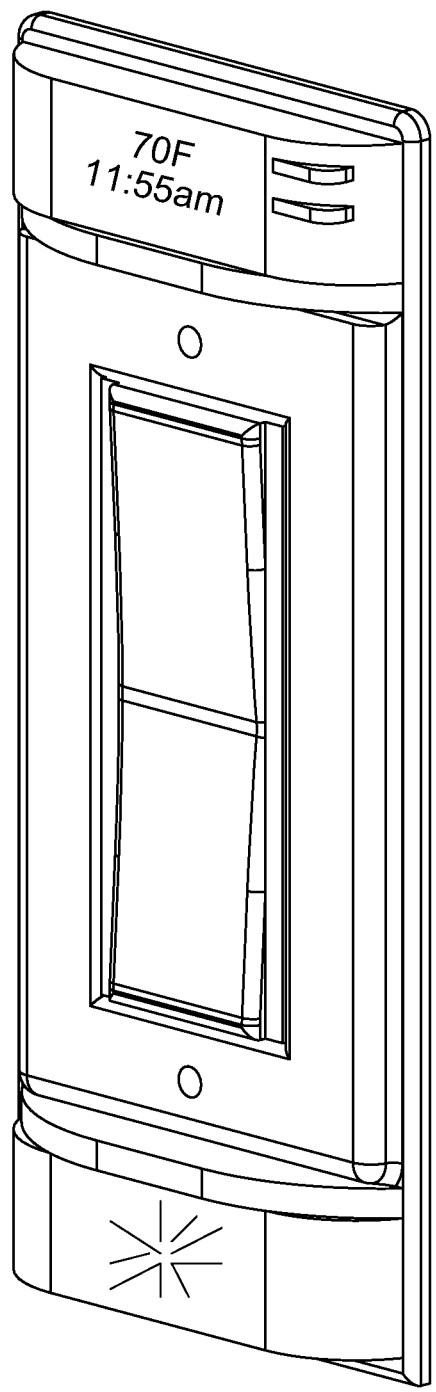
FIG. 10 illustrates a smart wall plate having multiple devices attached to a smart wall plate.

FIG. 10 illustrates an embodiment of a smart wall plate having several combined components. FIG. 10 shows a smart wall plate with a night light coupled to the bottom edge of the wall plate and a temperature and time display coupled to the upper edge of the wall plate. In one embodiment, the night light and/or temperature and time display may receive electricity from a one or more transformer circuits positioned inside an electrical wall box. The transformer circuit may provide electricity to additional auxiliary components and/or charging cradles. In another embodiment, a plurality of transformer circuits may be used to provide differing electrical characteristics to multiple auxiliary components and/or charging cradles. In another embodiment, the one or more transformer components may be completely contained within the smart wall plate. In another embodiment, the night light and/or temperature and time display may receive electricity from one or more batteries arranged within the smart wall plate.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. An apparatus for providing electrical power to a portable electronic device comprising:
   a wall plate for surrounding and coupling to an electrically terminated receptacle, the wall plate having a charging cradle with a resting platform for physically supporting the portable electronic device, the charging cradle being positioned at an outer edge of the wall plate, wherein the electrically terminated receptacle remains accessible and vacant;
   a male charging connector coupled to an opening slot of the charging cradle, wherein the male charging connector is insertable into a female charging port of the portable electronic device; and
   a transformer circuit coupled to the male charging connector, wherein the transformer circuit transforms a receiving electrical signal to an output electrical signal within a range sufficient for charging the portable electronic device.

2. The apparatus of claim 1, wherein the charging cradle further comprises a cradle backing for maintaining the portable electronic device in a resting position, the cradle backing being coupled to a wall by a fastener to provide additional physical support for the portable electronic device.

3. The apparatus of claim 1, wherein the wall plate and the charging cradle are made from injection-molded plastic.

4. The apparatus of claim 1, wherein the input electrical signal voltage is between 85-265 volts; and wherein the output electrical signal's output voltage is between 1-10 volts, the output current is between 100 milliamps-2 amps of direct current, and the output wattage is between 0.1-10 watts.

5. The apparatus of claim 4, wherein the output voltage is substantially 5 volts, the output current is substantially 2 amps of direct current, and the output wattage is substantially 10 watts.

6. The apparatus of claim 4, wherein the output voltage is substantially 5 volts, the output current is substantially 1 amp of direct current, and the output wattage is substantially 5 watts.

7. The apparatus of claim 1, further comprising a transformer circuit housing to isolate the transformer circuit from external contact with a conductive material.

8. The apparatus of claim 1, wherein the electrically terminated receptacle is a light switch.

9. The apparatus of claim 1, wherein the wall plate further comprises:
   a second charging cradle having a second resting platform for physically supporting a second portable electronic device, the second charging cradle positioned at an available outer edge of the wall plate.

10. The apparatus of claim 9, further comprising:
    a second male charging connector coupled to a second opening slot of the second charging cradle, wherein the second male charging connector is insertable into a female charging port of the second portable electronic device; and
    a second transformer circuit coupled to the second male charging connector, wherein the second transformer circuit transforms the receiving electrical signal to a second output electrical signal within a second range sufficient for charging the second portable electronic device.

11. The apparatus of claim 1, further comprising one or more auxiliary devices coupled to one or more available outer edges of the wall plate.

12. The apparatus of claim 11, wherein the auxiliary device is a standard battery charger capable of charging rechargeable batteries.

13. The apparatus of claim 1, wherein the electrically terminated receptacle is a wall socket capable of receiving a plug from a device.

14. The apparatus of claim 1, wherein the transformer circuit receives the receiving electrical signal via a direct connection to one or more electrical wires positioned behind the electrically terminated receptacle.

15. A method of manufacturing a smart wall plate comprising the steps of:
    determining a receiving electrical signal having an alternating current;
    determining an output electrical signal having an output voltage, an output current, and an output wattage, wherein the output electrical signal is within a range sufficient for charging a portable electronic device;
    assembling a transformer circuit capable of transforming the receiving electrical signal to the output electrical signal;
    manufacturing a wall plate for surrounding and coupling to an electrically terminated receptacle, wherein the wall plate has a charging cradle with a resting platform for physically accommodating the portable electronic device, the resting platform further having an opening slot where a male charging connector may extend through the opening slot, the charging cradle positioned at an outer edge of the wall plate, wherein the electrically terminated receptacle remains accessible and vacant; and manufacturing the male charging connector capable of insertion into a female charging port of the portable electronic device, the male charging connector to couple to an output end of the transformer circuit in order to receive the output electrical signal.

16. The method of claim 15, wherein the wall plate and the charging cradle are manufactured as a single piece.

17. The method of claim 15, further comprising:
providing a transformer circuit housing wherein the transformer circuit is stored within the transformer circuit housing to isolate the transformer circuit from external contact with a conductive material.

18. The method of claim 15, wherein the input electrical signal is between 85-265 volts; and wherein the output electrical signal's output voltage is between 1-10 volts, the output current is between 100 milliamps-2 amps of direct current, and the output wattage is between 2-10 watts.

19. The method of claim 18, wherein the output voltage is substantially 5 volts, the output current is substantially 2 amps of direct current, and the output wattage is substantially 10 watts.

20. The method of claim 18, wherein the output voltage is substantially 5 volts, the output current is substantially 1 amp of direct current, and the output wattage is substantially 5 watts.

21. The method of claim 15, wherein the wall plate and the charging cradle are made from injection-molded plastic.

22. The method of claim 15, wherein the charging cradle further comprises a cradle backing for maintaining the portable electronic device in a resting position, the cradle backing is coupled to a wall by a fastener to provide additional physical support for the portable electronic device.

23. The method of claim 22, further comprising:
manufacturing a second male charging connector coupled to a second opening slot of the second charging cradle, wherein the second male charging connector is insertable into a female charging port of the second portable electronic device; and determining a second output electrical signal having a second output voltage, a second output current, and a second output wattage, wherein the second output electrical signal is within a range sufficient for charging the second portable electronic device; and assembling a second transformer circuit capable of transforming the receiving electrical signal to the second output electrical signal to the second portable electronic device.

24. The method of claim 15, wherein the electrically terminated receptacle is a light switch.

25. The method of claim 15, wherein the wall plate further comprises:
a second charging cradle having a second resting platform for physically supporting a second portable electronic device, the second charging cradle positioned at an available outer edge of the wall plate.

26. The method of claim 25, wherein the second transformer circuit is stored within the transformer circuit housing to isolate the second transformer circuit from external contact with the conductive material.

27. The method of claim 15, further comprising one or more auxiliary devices coupled to one or more available outer edges of the wall plate.

28. The method of claim 27, wherein the auxiliary device is a standard battery charger capable of charging rechargeable batteries.

29. The method of claim 15, wherein the transformer circuit receives the receiving electrical signal via a direct connection to one or more electrical wires positioned behind the electrically terminated receptacle.

30. The method of claim 15, wherein the electrically terminated receptacle is a wall socket capable of receiving a plug from a device.

31. The method of claim 15, wherein the wall plate and the charging cradle are permanently coupled to one another, creating a single piece.

* * * * *